United States Patent [19]

Shellenberger

[11] Patent Number: 4,729,328
[45] Date of Patent: Mar. 8, 1988

[54] TRAP ASSEMBLY FOR A CONDENSING FOSSIL FUEL FURNACE

[75] Inventor: Timothy J. Shellenberger, Fort Smith, Ark.

[73] Assignee: Rheem Manufacturing Company, New York, N.Y.

[21] Appl. No.: 41,838

[22] Filed: Apr. 23, 1987

[51] Int. Cl.$^4$ .................................................. F23N 5/24
[52] U.S. Cl. ..................... 110/193; 110/186; 110/203; 422/178; 126/110 R
[58] Field of Search ............... 110/193, 203, 186, 215, 110/216; 422/178, 173; 55/267; 126/110 R

[56] References Cited

U.S. PATENT DOCUMENTS

| | | |
|---|---|---|
| 311,507 | 2/1885 | McGwin . |
| 680,718 | 8/1901 | Labadie . |
| 948,028 | 2/1910 | Tillison . |
| 1,104,954 | 7/1914 | Baker . |
| 1,282,638 | 10/1918 | Schneider . |
| 1,638,900 | 8/1927 | Wiley . |
| 2,114,765 | 4/1938 | Hall . |
| 2,625,133 | 1/1953 | Hein . |
| 2,911,926 | 11/1959 | Kocee . |
| 3,751,884 | 8/1973 | Hathorn . |
| 3,771,468 | 11/1973 | Kelly . |
| 3,791,318 | 2/1974 | Oseroff et al. . |
| 3,944,136 | 3/1976 | Huie . |
| 4,164,210 | 8/1979 | Hollowell . |
| 4,227,647 | 10/1980 | Eriksson . |
| 4,261,326 | 4/1981 | Ihlenfield . |
| 4,275,705 | 6/1981 | Schaus et al. . |
| 4,289,730 | 9/1981 | Tomlinson . |
| 4,303,198 | 12/1981 | Dulac . |
| 4,309,947 | 1/1982 | Ketterer . |
| 4,318,392 | 3/1982 | Schreiber et al. . |
| 4,419,942 | 12/1983 | Johnson . |
| 4,444,156 | 4/1984 | Iwasaki et al. . |
| 4,543,892 | 10/1985 | Tomlinson et al. . |
| 4,682,579 | 7/1987 | Bigham . |

Primary Examiner—Edward G. Favors
Attorney, Agent, or Firm—Allegretti, Newitt, Witcoff & McAndrews, Ltd.

[57] ABSTRACT

An improved trap assembly for a high efficiency fossil fuel furnace includes a vertical tube closed at its lower end with a condensate inlet immediately above the lower end and a condensate outlet above the inlet. A flue gas inlet is provided at the top end of the tube with a flue gas outlet immediately adjacent thereto. A float with a sealing cap is positioned within the tube and rises in response to the level of condensate to block the flue gas outlet.

3 Claims, 5 Drawing Figures

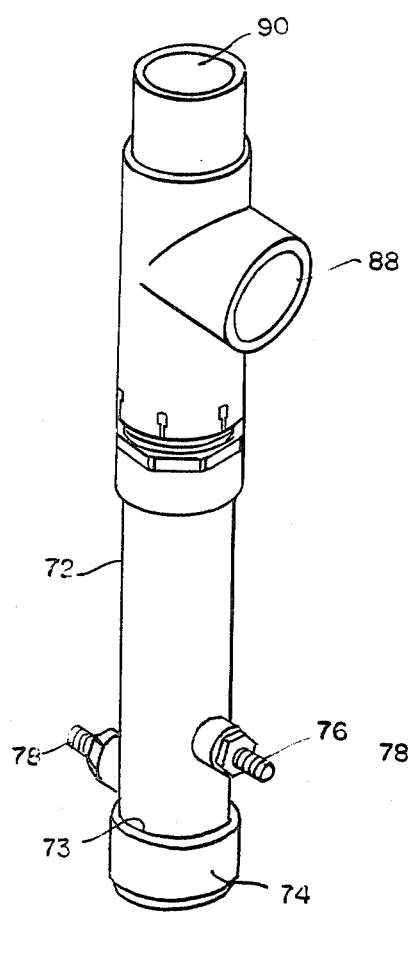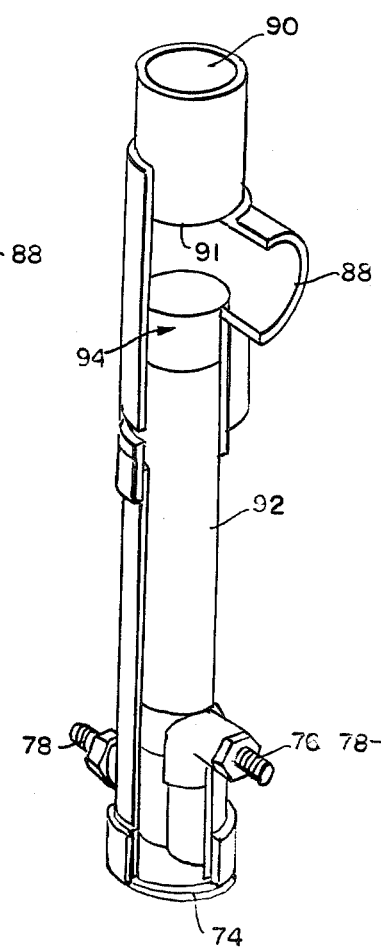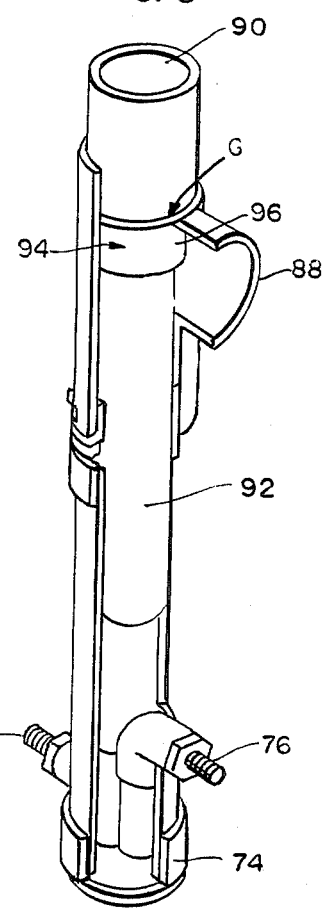

TRAP ASSEMBLY FOR A CONDENSING FOSSIL FUEL FURNACE

BACKGROUND OF THE INVENTION

This invention relates to a furnace of the type having a combustion chamber for ignition of a fuel and air mixture and, in particular, to the means for controlling the discharge of the condensate and flue gas by-products of combustion.

Gas furnaces typically include a heat exchanger having a combustion chamber for combustion of a fuel and air mixture. The heat exchanger is designed to permit the passage of air over the combustion chamber. Often the heat exchanger includes a secondary heat exchanger to enhance the transfer of heat to a medium which is then directed to an enclosure for heating thereof.

Concomitantly with transfer of heat from the combustion products, the combustion products are cooled and liquid condensate will form during the heat extraction process particularly in the secondary heat exchanger. The condensate is typically collected and directed through a conduit from the heat exchanger to a drain. However, because the condensate may constitute an acid solution, it is common to direct the condensate products through an acid neutralizing media before it is passed into a drain.

Devices of this nature are disclosed particularly in Tomlinson et al, U.S. Pat. No. 4,543,892 entitled "Condensate Handling Means for Condensing Furnace". In Tomlinson et al, flue gas and condensate flow into a vertical tube. The flue gas products discharge upwardly through the vertical tube and the condensate products flow downwardly through the tube, through a trap at the bottom of the tube and then through a neutralizing media. In known embodiments of the device depicted in the Tomlinson et al patent, a styrofoam float is additionally provided within the vertical collection tube to block the flow of flue gas in the event the trap becomes somehow blocked. The float is buoyed by the condensate in such a circumstance to close the flue gas passage.

Other patents disclose similar furnaces and teach various ways to neutralize the collected condensate collected from the combustion products including Ketterer in U.S. Pat. No. 4,309,947 entitled "Mounting Arrangement for Condensate Neutralizer in a Furnace" and Tomlinson in U.S. Pat. No. 4,289,730 entitled "Furnace with Flue Gas Condensate Neutralizer". The concept of collecting condensate from a heat exchanger is also taught in Herbert U.S. Pat. No. 3,212,288 entitled "Heat Exchanger with Condensate Collector".

The various referenced prior art patents disclose highly useful and efficient means for collecting condensate and discharging flue gas from a hot air furnace and, in particular, a gas hot air furnace. However, there has remained a need to provide an improved trap assembly associated with such furnaces. That need inspired the development of the present invention.

SUMMARY OF THE INVENTION

Briefly the present invention comprises an improvement in a furnace of the type including a heat exchanger with a combustion chamber for ignition of a fuel and air mixture, means for introducing a fuel and air mixture to that chamber, means for igniting the fuel and air mixture, a combustion product plenum connected to the chamber for directing combustion products from the chamber to a flue gas exhaust passage, and a fluid drain conduit for draining combustion products (i.e. condensate) from the combustion chamber and the plenum. Specifically, the improvement is a trap assembly for the drain conduit which includes means cooperative with the exhaust passage to collect and pass the condensate to a drain while simultaneously being capable of terminating furnace operation if the condensate flow from the trap assembly becomes somehow blocked causing excessive condensate to accumulate.

The trap assembly includes a condensate inlet positioned near the bottom of a vertical tube closed at its lower end. Immediately above the condensate inlet is a condensate outlet which typically connects through a neutralization media to a drain. Positioned further above the condensate outlet is a flue gas inlet through the side of the tube. Finally, the tube extends vertically upward to define a flue gas outlet.

A float is positioned within the vertical tube and includes a specially constructed cap for forming a seal with the flue gas outlet when the float is raised a sufficient height to simultaneously block the flue gas inlet. The float rides upon the condensate collected within the tube and will only operate to terminate flue gas flow whenever the condensate outlet is blocked. Thus, only when condensate collects in a sufficient amount within the vertical tube will the flue gas inlet and outlet be blocked.

Sensing means within the plenum connected to the flue gas inlet is designed to detect a pressure change within the plenum when the flue gas inlet is blocked. When that pressure change is sensed, switch means operates to terminate the flow of the fuel and air mixture to the combustion chamber of the furnace.

Thus, it is an object of the present invention to provide an improved trap assembly for the combustion products from a furnace of the type which combusts a fuel and air mixture and releases a combination of condensate and flue gas products.

Yet a further object of the present invention is to provide an economical, easy to use, and efficient combustion product trap assembly for a fossil fuel furnace.

Yet a further object of the present invention is to provide an improved trap assembly for collecting and neutralizing condensate that passes through a first set of connected passages and for directing flow of flue gas through a second set of passages, all the passages being interconnected to control the flow of condensate as well as the flow of flue gas through the furnace.

Yet another object of the invention is to provide an improved a safe way for the collection of condensate from a heat exchanger.

Yet a further object is to provide a single, low cost trap assembly for a high efficiency furnace to collect the condensate and flue gas products in compliance with appropriate industry and government standards.

One further object of the invention is to provide a single assembly accomplishing the aforesaid objectives which is not dependent upon expensive electrical sensing devices and which is low cost, easy to maintain, easy to construct, and rugged.

These and other objects, advantages and features of the invention will be set forth in the detailed description which follows.

BRIEF DESCRIPTION OF THE DRAWING

In the detailed description which follows, reference will be made to the drawing comprised of the following figures:

FIG. 3 is a perspective view of the component part of the trap assembly incorporated in FIG. 2;

FIG. 4 is a cutaway perspective view of the trap assembly of FIG. 3 wherein the float, which rides on the condensate within the trap assembly, is in its lower or first position; and FIG. 5 is a cutaway perspective view similar to FIG. 4 wherein the float has been transported to its second or flue gas blocking position in response to the rise of condensate within the vertical tube portion of the trap assembly.

DESCRIPTION OF THE PREFERRED EMBODIMENT

Figure 1:
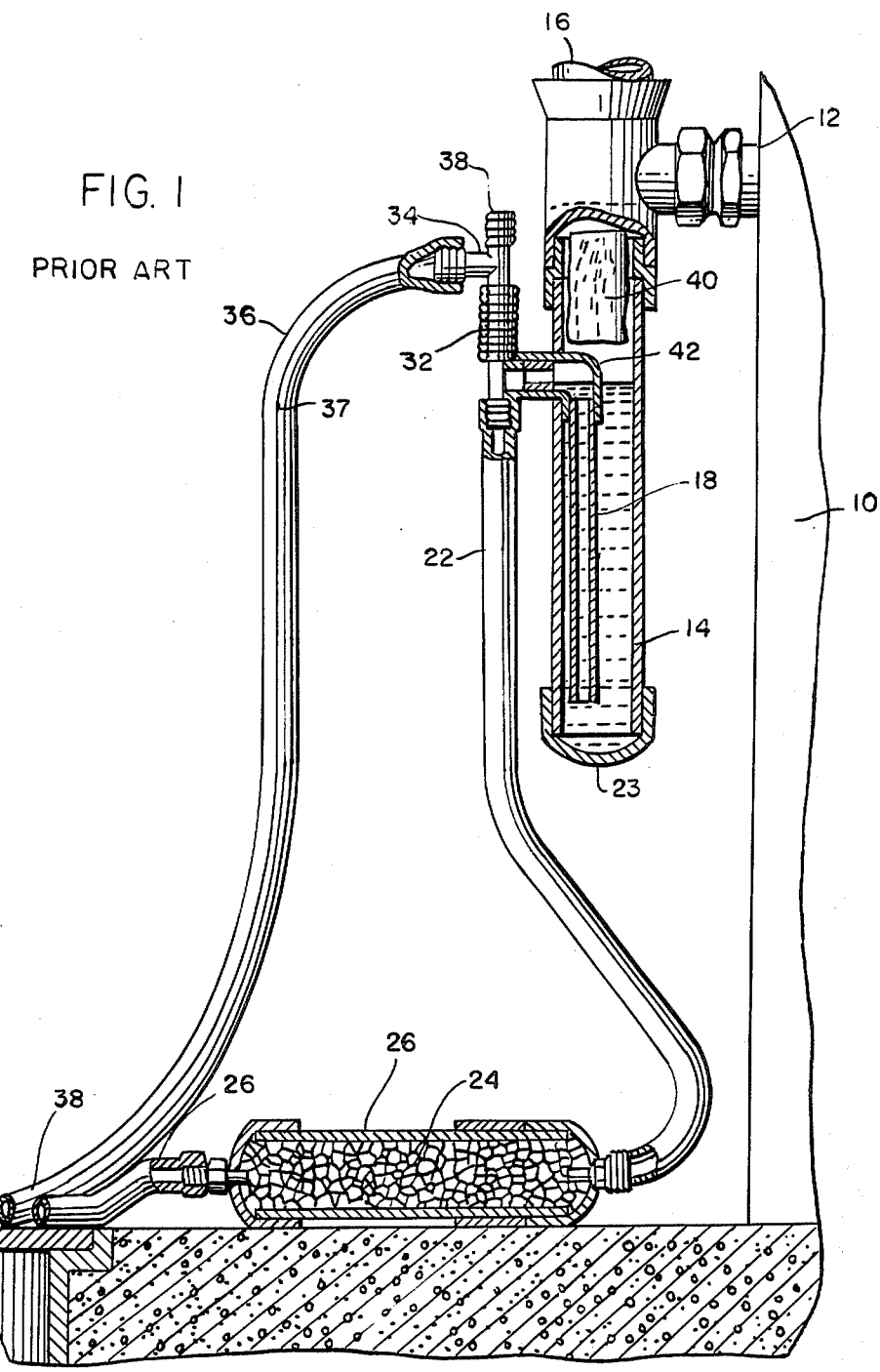
FIG. 1 is a typical prior art device.

Referring to FIG. 1, there is illustrated a prior art, high efficiency, condensing furnace generally depicted at 10. Flue gas and condensate flow from the furnace 10 through a discharge passage 12. Condensate, which is typically water mixed with various acid components, will then flow downward to the lower portion of a collection tube 14. Gas products, namely flue gas products, flow upwardly through an exhaust outlet 16 from the tube 14.

An outlet line 18 extends from the bottom of the tube 14 upwardly through an outlet connector 42 through the side of the tube 14 and down through a conduit 22. Condensate which flows through the outlet line 18 and conduit 22 flows through a neutralizing media 24 retained within a neutralizing device 26 and thence through an outlet tube 28 to a drain 30. In the event of condensate overflow through the tube 22, due to the fact that the device 26 is blocked, condensate will flow upwardly through a line 32 and through a T connection 34 to a bypass tube 36 which also connects to the drain 30. A vapor vent 38 connects to the T connection 34 to prevent blockage due to vapor or gas formation.

Within the prior art trap assembly as depicted in FIG. 1, a styrofoam float 40 may be positioned above the elbow 42 associated with the line 18. When condensate fills the tube 14, float 40 rises thereby partially blocking off the flue gas flow through the passages 12 and 16. However, condensate continues to flow from passage 12 over the float 40 filling the tube 14. So it is important to avoid totally blocking of the passage 12. The float 40 when serves to partially block off passage 12 may cause a back pressure which is sensed within the furnace 10 thereby operating a switching mechanism (not shown) to terminate operation of the furnace. Line 32 continues to act as a condensate bypass, though line 32 may be excluded since the device is supposed to terminate operation of the furnace.

However, the prior art device does not contemplate full termination of flue gas flow through the exhaust passage 12 or termination of condensate flow through the condensate passages of the device. As a result, the furnace may continue to operate, though undesirably.

FIGS. 2-5 disclose the trap assembly of the present invention which is designed to totally terminate flue gas flow and the operation of a furnace in the situation where a condensate neutralizer package or device becomes blocked. Thus, referring to FIG. 2, a high efficiency hot air furnace 50 includes a forced air fan 52 which delivers air to a heat exchanger assembly 54 for heating. The heated air then passes upward through the furnace 50, then through an outlet 56 from the furnace 50 to the enclosure being heated.

Figure 2:
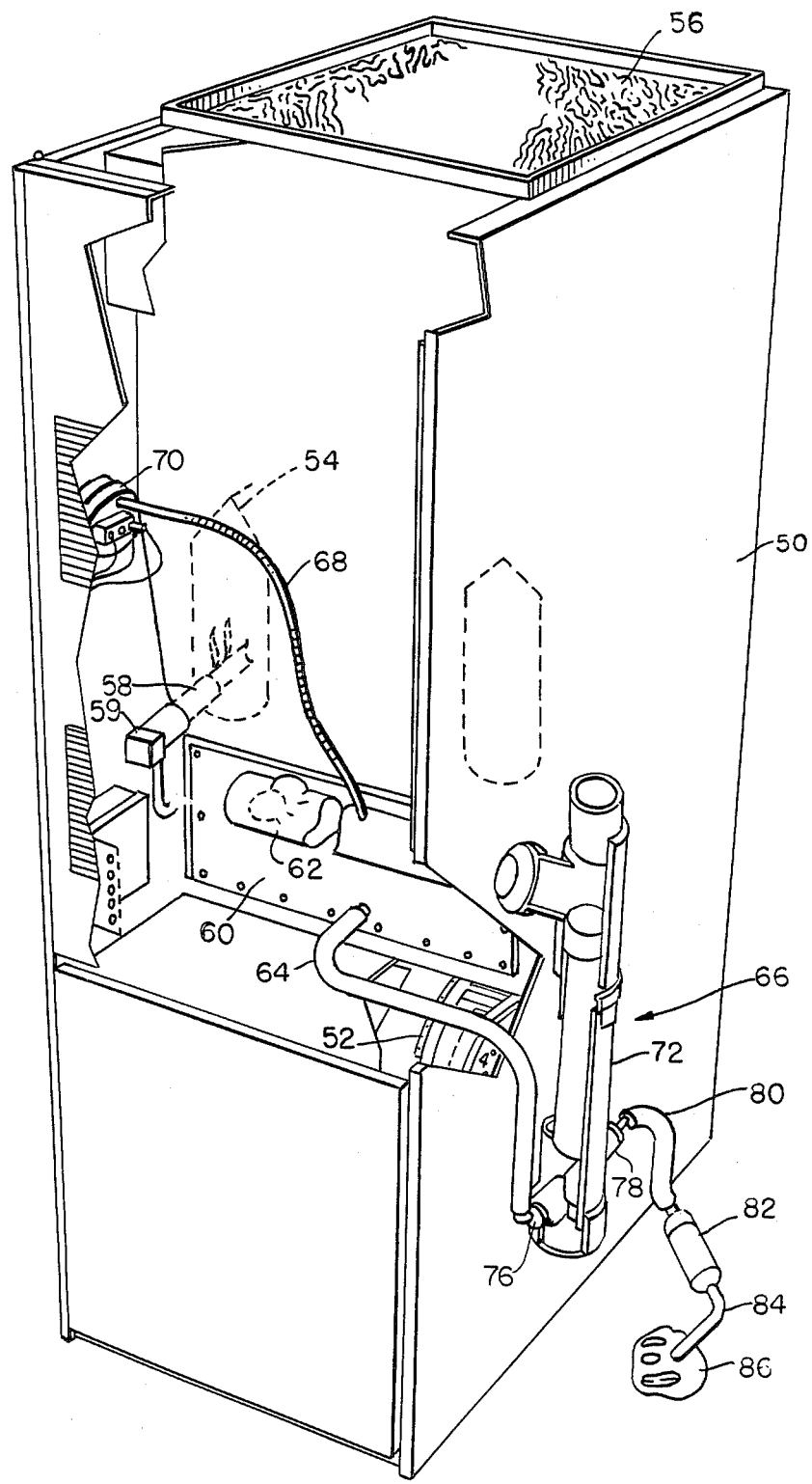
FIG. 2 is a perspective view of a typical high efficiency, forced air, gas furnace incorporating the improved trap assembly of the present invention.

Within the heat exchanger 54, shown schematically in FIG. 2, a gas and air mixture is delivered by a gas burner tube assembly 58 for combustion within the heat exchanger 54. Controls 59, as known to those skilled in the art, provide the appropriate gas and air mixture to burner 58. The design and operation of the heat exchanger 54 as well as a secondary heat exchanger, in order to increase the efficiency of the furnace 50, is known to those skilled in the art.

For purposes of the invention, the combustion products from the burning of the fuel and air mixture are collected in a plenum 60. The flue gas portion of the combustion products passes from the plenum 60 through a flue gas tube or pipe 62. Liquid condensate collects at the bottom of the plenum 60 and passes through a conduit tube 64 or drain tube 64 to the improved trap assembly of the present invention; namely, the trap assembly 66. A pressure sensing tube 68 is connected to the flue gas passage 62 at one end and is connected at its opposite end to a pressure switch 70 that controls the input of ignitable materials to the burner 58. When the back pressure through the sensing tube 68 increases above a permissible limit, the pressure switch 70 senses this increased pressure thereby terminating the flow of combustible fuel to the furnace 50 and terminating operation of the furnace 50.

The trap assembly 66 is constructed so as to provide for initiation of the appropriate pressure sequence through the sensing tube 68 in the event the drain tube 64 or the condensate flow from the plenum 60 have become somehow blocked. Specifically, therefore, the remainder of the description will be directed to the construction of the trap assembly 66 and its component parts. Thus, as shown in FIGS. 2-5, the trap assembly 66 includes a vertical, generally cylindrical, hollow tube 72. The tube 72 is sealed at its lower end 73 by a cap construction 74.

The drain tube 64 leads through an inlet 76 into the lower end of the tube 72. A drain outlet 78 extends from the inside of the tube 72 and discharges vertically below the level of the inlet 76. Thus, condensate flow into the tube 72 will collect within the bottom of the tube 72 and, upon reaching an appropriate level, will flow outwardly through the outlet 78.

As shown in FIG. 2, the flow from the outlet 78 passes through discharge tubing 80, then through a neutralizing device 82 of a type known to those of skill in the art. A final drain tube 84 connects from the neutralizing device 82 into a drain 86.

The vertical tube 72 includes a right angle, uniform diameter, flue gas inlet 88 which connects from the passage 62 directly into the tube 72. The flue gas inlet 88 is positioned above the condensate outlet 78 approximately 12 inches in the circumstance where the diameter of the tube is approximately 2 inches. The distance of the flue gas inlet 88 above the condensate outlet 78 may be varied according to desire and need depending upon the internal diameter of the tube 72, the rate at which condensate is collected and flows through the trap, and the neutralizing device 82, as well as other empirical factors that will be developed upon building of such a trap assembly for a particular model furnace.

A flue gas outlet tube 90 constitutes a vertical upward extension of the tube 72 and normally connects with the flue gas inlet 88. During normal operation of the furnace, flue gas flows through the inlet 88 and directly through the outlet tube 90, thence to a chimney or other exhaust associated with the furnace 50. Simultaneously condensate flows through the drain tube 64 into the trap inlet 76 at the bottom of the tube 72 and through the outlet 78 to the neutralizing device 82.

A float 92 comprising an elongate cylindrical member is positioned to slidably move within the tube 72. The float 92 includes a cap member 94 having an external diameter slightly greater than the internal diameter of the tube 90 defining the outlet. In this manner (since tube 90 slips or fits within tube 72 and has a lesser diameter than tube 90) the cap 94 can form a seal against the bottom of tube 90. Thus, cap 94 has a generally cylindrical shape coincident with the internal shape of the tube 72 with a diameter slightly less than the diameter of tube 72.

Float 92 and cap 94 have a density less than that of the condensate. The float 92 is thus buoyed by the condensate which flows into the tube 72. When the condensate level increases sufficiently, the float 92 will move upwardly causing the generally cylindrical cap 94 to cooperate with the lower cylindrical flange or edge 91 of outlet tube 90 and block not only a part of the inlet passage 88, but seal the outlet tube 90. That is, the float or cap 94 has a generally cylindrical planar surface which forms as a seal against the lower face of the tubing defining the flue gas outlet 90.

The length of the skirt 96 of the cap 94 is such that when the cap 94 is in the fully raised position as it floats upwardly due to the level of condensate, there remains some clearance for passage of flue gas about the float 92. This will tend to pressurize the position of the cap 94 against the outlet 90 by acting on the lower surface or rim of skirt 96 thereby maintaining the seal of the cap 94 against tube 90. This also causes pressure within the line or passage 62 to increase dramatically and quickly thereby effectively and quickly causing a pressure signal to pass to the sensing tube 68 to be detected by the pressure switch 70. The mechanism provides a simple, yet quick and effective way for causing pressure to terminate flow of flue gas and to initiate the sequence of switching to terminate operation of the furnace.

The skirt 96 is also shaped to conform generally to the internal shape of the tube 72. This promotes vertical alignment of the float 92 in tube 72 as the float 92 is transported on the condensate.

It is possible, of course, to vary the shape and configuration of the cap 94 as well as the float 92 and the internal construction and cross section of the tube 72. Importantly, the relative position flue gas inlet 88, outlet tube 90 and the cooperative relationship between the cap 94 and outlet tube 90 are all very important to the invention. Note, for example, that relative to the prior art, gas venting or discharge from the condensate occurs in tube 72 rather than externally. Also, note the unique cooperative relationship and sizing of the cap 94 relative to the tube 72 and outlet tube 90. Also, the relationship of inlet 76 and outlet 78 can be reversed without rendering the invention ineffective. The device will operate in either configuration. The invention is therefore to be limited only by the following claims and their equivalents.

What is claimed is:

1. In a furnace of the type including a heat exchanger with a combustion chamber for combusting a fuel and air mixture;
   means for introducing a fuel and air mixture to the chamber;
   means for igniting the fuel and air mixture;
   a combustion product plenum connected to the chamber for directing combustion products from the combustion chamber to a flue gas exhaust passage;
   a fluid drain conduit for draining combustion product condensate from the combustion chamber and the plenum;
   the improvement comprising in combination:
   a trap assembly for the drain conduit, said assembly including trap means to collect and pass through condensate from the combustion chamber and plenum and said assembly also including means to terminate furnace operation if condensate flow from the trap means becomes blocked, said trap assembly including:
   a vertical tube sealed at its lower end and having a side wall, said tube also including a condensate conduit outlet adjacent the lower end, a condensate conduit inlet above the outlet, a flue gas outlet vertically above the conduit inlet and extending through the side wall of the tube connected to the combustion chamber and plenum, a flue gas outlet at the upper end of the vertical tube above the flue gas inlet;
   a condensate float in the tube, said float having a density less than the density of water, said float translatable in the vertical direction in the tube on condensate in the tube between a first lower position and a second raised position for closing the flue gas path from the flue gas inlet through the flue gas outlet, said float including a cap member conforming generally in shape with the flue gas outlet for sealing engagement with the outlet when the float is in the raised position, said cap defining means for aligning the float within the tube and for maintaining alignment of the float in the tube;
   pressure sensing means connected to the plenum; and
   switch means responsive to the pressure sensing means for terminating operation of the means for introducing a fuel and air mixture to the chamber of the furnace whenever the cap closes the flue gas outlet and thereby changes the pressure in the plenum.

2. The improved trap assembly of claim 1 wherein the cap member is cylindrical and defines a circumferential valve cooperative with the outlet which defines a circular seat.

3. The improved trap assembly of claim 1 wherein the cap includes a vertical skirt dimensionally shorter than the diameter of the flue gas inlet.

* * * * *